G. H. BENJAMIN.
MACHINE FOR SOLDERING CHAINS.
APPLICATION FILED MAY 29, 1909.
978,543.
Patented Dec. 13, 1910.
2 SHEETS—SHEET 2.
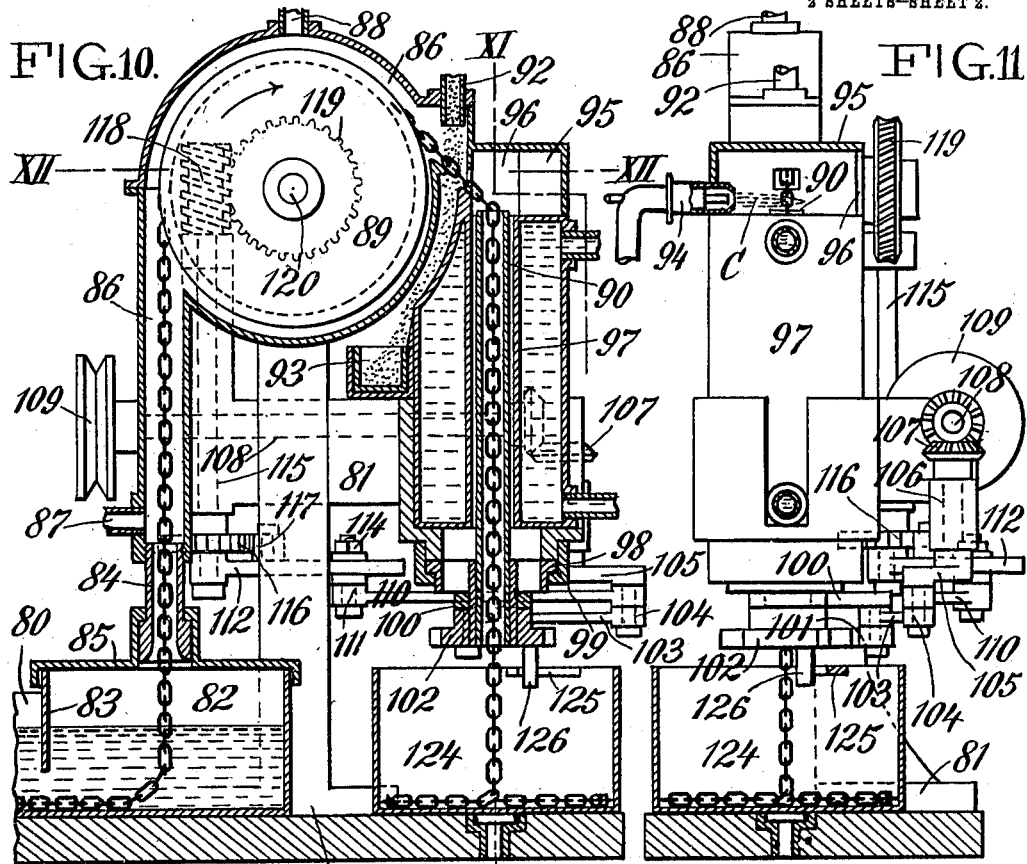
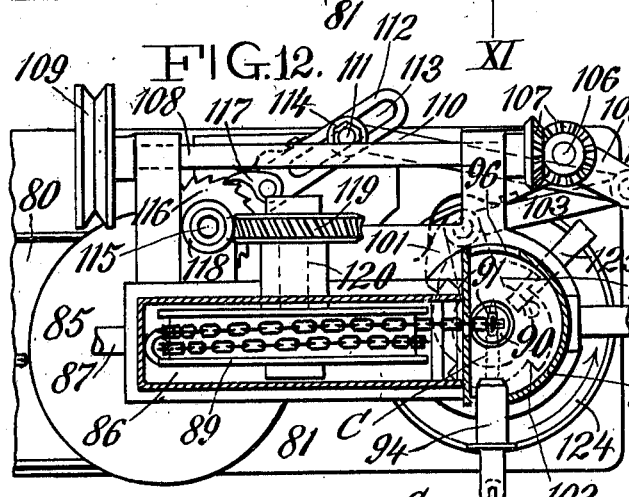
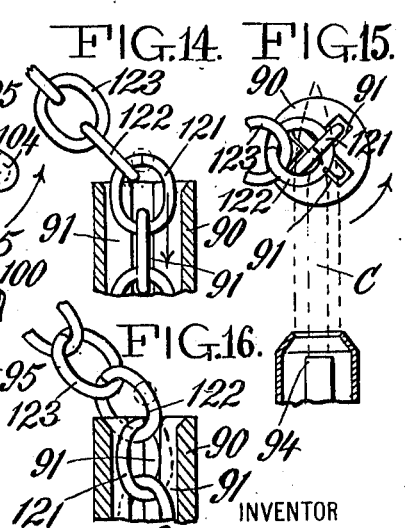
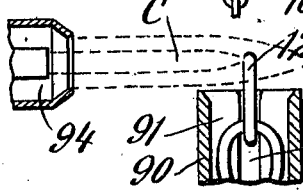
WITNESSES:
Helen E. Koelsch
Eli Weill
INVENTOR
Geo. H. Benjamin
BY
ATTORNEY

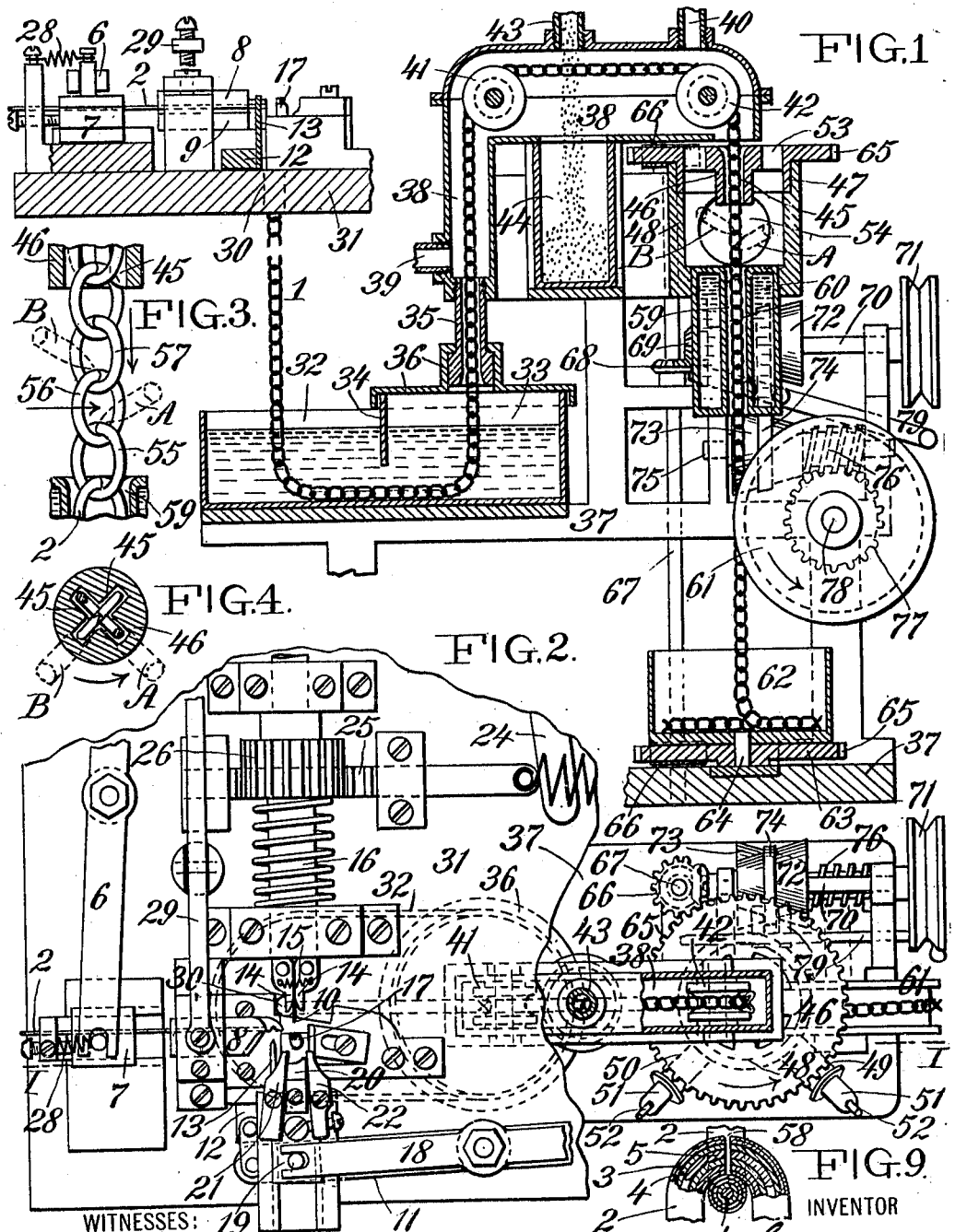
G. H. BENJAMIN.
MACHINE FOR SOLDERING CHAINS.
APPLICATION FILED MAY 29, 1909.
978,543.
Patented Dec. 13, 1910.
2 SHEETS—SHEET 1.

UNITED STATES PATENT OFFICE.

GEORGE HILLARD BENJAMIN, OF NEW YORK, N. Y., ASSIGNOR TO H. F. BARROWS CO., OF NORTH ATTLEBORO, MASSACHUSETTS.

MACHINE FOR SOLDERING CHAINS.

978,543.  Specification of Letters Patent. Patented Dec. 13, 1910.

Application filed May 29, 1909. Serial No. 499,232.

*To all whom it may concern:*

Be it known that I, GEORGE H. BENJAMIN, a citizen of the United States, residing at the city, county, and State of New York, have invented certain new and useful Improvements in Machines for Soldering Chains, of which the following is a specification.

This invention consists of automatic devices whereby a continuous length of wire provided with a fusible solder core, is first cut into short lengths and bent into a series of connected links, the series of links or chains being then passed through an etching solution, then up through a chamber containing a non-oxidizing gas; the chain being then coated with magnesia, and then passed down through guides in the center of a rotating wheel which causes rotation of the chain to counteract the twist caused by the aforesaid mechanism which formed the series of connected links. During the rotary and downward travel of the chain, it is exposed to two flames, which heat the jointed portions of the links, thereby causing the solder contained within the wire of the links to flow out into the joint, thus effectually securing the links. After the links are heated they are cooled by means of a cooling jacket and then passed around a revolving wheel which serves to move the chain forward, and to deliver the chain to a receptacle which is kept revolving to prevent twist of the chain.

In the accompanying drawings Figure 1 is a sectional elevation on the line I—I of Fig. 2, showing a machine for carrying out this invention; Fig. 2 is a sectional plan view; Figs. 3 and 4 are enlarged detail views showing a series of links, and the operation of heating the joints; Figs. 5, 6, 7 and 8 are detail views, showing successive steps by which the series of interconnected links are formed; Fig. 9 is a much enlarged view of the links, showing the contained fusible solder and two abutting ends of the wire which are to be joined by means of the solder; Fig. 10 is a modification of the devices for performing the operations after the said series of connected links are formed; Fig. 11 is a sectional elevation on the line XI—XI of Fig. 10; Fig. 12 is a sectional plan view on the line XII—XII of Fig. 10; Figs. 13 and 14 are enlarged detail views, showing a series of links, as shown in Figs. 10, 11 and 12, and the operation of heating one of the joints; Fig. 15 is a detail plan view, showing a partial rotation and forward movement of the chain from the position shown in Figs. 13 and 14; and Fig. 16 is a sectional elevation of parts shown in Fig. 15.

The chain 1 is composed of a series of links, each link being made of a bent wire 2, having two ends abutting, as shown in Figs. 3, 4 and 9. As shown in Fig. 9, the wire 2 of which the links are made is composed of a tube of plater's metal 3, having an outer coating of gold. Inside the tube 3 is a core of fusible solder 4, and inside of the solder is a central wire 5 of plater's metal.

Referring now to the machine represented in Figs. 1 to 9, inclusive, a lever 6 actuates a clutch 7, which engages the wire 2 and forces it between plates 8, 9 and forward through a previously formed link 10, as shown in Figs. 2 and 5. By means of a lever 11, which actuates a slide 12, carrying a knife 13, the wire 2 is then cut, leaving a short length suspended in the previously formed link 10. The previously formed link 10 is supported by the pivoted jaws 14 which are held together by a spring 15. The jaws 14 are pivoted upon the end of a shaft 16, which is given a sliding longitudinal movement, causing the free ends of the jaws to force the ends of the short cut-off length of wire 2 around a mandrel 17, during which operation the jaws are separated, as shown in Fig. 6. During withdrawal of the jaws 14, a lever 18 actuates a slide 19, carrying a central former 20, and side jaws 21 and 22. The jaw 21 holds the bent end of the wire against one side of the mandrel, while the central former 20 turns the other end until the two ends abut, as shown in Fig. 7. The previously formed link 10 will then have been released from the jaws 14, and will be supported by the newly formed link 23 on the mandrel 17. By means of a lever 24, which actuates a rack-bar 25 in mesh with a pinion 26 secured to shaft 16, the shaft is given a quarter turn, during which time the shaft also receives a longitudinal sliding movement toward the mandrel 17. Accordingly, when the shaft has reached the end of its longitudinal movement, the jaws 14 will be turned from the position shown in Fig. 7 to the position shown in Fig. 8. The newly formed link 23 will then be forced between the jaws 14, the jaws 14 being cut away at one side, as shown by dotted lines 27 in Fig. 7, to make room for link 10. The shaft 16 will then be returned to the position shown in Fig. 2, carrying the jaws 14 and the links 23 and 10 with it. The clutch 7 will then have been returned by means of a spring 28, return movement of the wire 2 being prevented by means of a lever 29, which forces the upper plate 8 and the wire 2 against the lower plate 9. Shaft 16 will then be moved forward, carrying the newly formed link 23 alongside the mandrel 17, and the former 20, and side jaws 21 and 22 will be moved to the position shown in Fig. 5. The wire 2 will then be moved forward by clutch 7 until stopped by jaw 22, and the above described operations will then be repeated.

It will be seen that each newly formed link is given a quarter revolution in order that wire 2 can be passed through it. Consequently the chain composed of a series of such links will have a rotary motion caused by a succession of such quarter revolutions.

As no invention is here claimed for the means for forming the chain, further description of the mechanism for actuating the parts for forming the chain is omitted.

The chain formed in the manner described is passed down through a hole 30 formed in plate 31, and is then passed into a tank 32 containing a solution which etches the metal, thereby preparing the surfaces at the abutting ends of the wire for the soldering operation. The chain passes up from the solution into a chamber 33 which is sealed from the entrance by a partition 34. The chain then passes up into a tube 35, and upon the outside of tube 35, a cover 36 for chamber 33 has vertical movement, in order that tank 32 can be removed from its support on frame 37. From tube 35 the chain passes up into a chamber 38, through which a non-oxidizing gas is conveyed by means of the pipes 39 and 40. During its travel in chamber 38, the chain is protected against oxidation by means of the non-oxidizing gas. Within the chamber 38 are placed rollers 41 and 42, and the chain passes up and over roller 41 and horizontally across to roller 42, and while traveling from roller 41 to roller 42, magnesia is poured onto the chain through a pipe 43. The magnesia not finding lodgment on the chain, is permitted to fall into a drawer 44, which can be removed when necessary. The coating of magnesia is intended to protect the outer surface of the link from the solder that might possibly flow out from between the abutting ends of the wire. From roller 42, the chain passes downward through guides 45 formed in the center of a revolving wheel 46, which causes the chain, as it passes through the guides, to be continuously rotated in the same direction as caused by the successive quarter revolutions during formation of the links. Wheel 46 is provided with a cylindrical extension 47, which rotates in a bearing formed at the upper end of a stationary cylinder 48. Mounted on stationary cylinder 48 are two blow-pipe burners 49 and 50, which project flames A and B against the chain as it passes down from the guide 45 in wheel 46. The burners 49 and 50 are each provided with a gas supply pipe 51, and an air supply pipe 52. The wheel 46 and the stationary cylinder 48 are provided with vents, as at 53 and 54, to permit hot products of combustion to escape and to prevent undesirable heating of the chain.

The flames A and B are directed toward the chain, at right-angles to each other, are inclined slightly downward, and directed toward the joint of two adjoining links, as shown in Figs. 1 and 3. The machine is so proportioned that downward movement of the chain past the flames, has such a relation to the rotary movement, that at the end of a quarter revolution of the chain, it will have moved downward a distance equal to the length of one link.

Referring to Figs. 3 and 4, with the chain moving continuously downward, and rotating continuously in the direction indicated by the arrow, the action of the flames on the chain will be as follows: Starting with the flame A striking the joint of link 55, while the chain is moving downward and rotating, flame A will move past the upper end of link 56, and at the last part of a quarter revolution, flame A will be striking the joint of link 56. Then again, while the chain is moving farther downward and rotating flame A will move past the upper end of link 57, and at the last part of a quarter revolution, flame A will be striking the joint of link 57, and so forth. Flame B is so placed above flame A that it strikes the joint of a link above the link the joint of which flame A strikes, and is so placed as to have like relation to the links. It will readily be seen that during the downward movement and rotation of the chain, flame B will follow the same course with reference to the links in its path as does flame A. The chain as a whole will not be greatly heated, as the flames are directed toward the jointed portions of the links to a greater extent than the rest; thereby causing flow of only enough solder to fill the space between the abutting ends, and preventing flow of solder against the outer surfaces of the links, which latter is in a measure prevented by the magnesia coating.

When heat is applied to the abutting ends of wire made as previously described, the solder 4 melts and runs into the space 58 between the abutting ends, as shown in Fig. 9. Owing to the fact that the solder is distributed between the central wire 5 and the outer tube 3, when the solder runs, it lodges between the abutting ends of the central wire 5, and also between the abutting ends of the outer tube 3, whereas, if the solder were contained only in the center of a tube, the solder would run too freely in consequence of there being too small a proportion of the infusible metal in the path of the flowing solder.

After the chain has moved past the flames A and B, it is passed through a tube 59, which is cooled by a cooling jacket 60. The chain is then passed once around a wheel 61, and the wheel being continuously rotated, serves to move the chain continuously forward. It will therefore be seen that the chain is continuously rotated by means of guides 45 in wheel 46, and also continuously fed through the blow-pipe flames by means of wheel 61.

In the chain forming mechanism the chain is intermittently rotated and intermittently fed. In order that the machine may work properly, the rotation and forward movement of the chain by wheels 46 and 61 is made equal in a given time to the sum of the intermittent rotary and forward movements in the forming mechanism; the consequent intermittent and slight tightening and loosening of the chain occurring in the slack portion in the receptacle 32. From wheel 61, the chain passes downward into a receptacle 62, which may be removed, as desired. Receptacle 62 is mounted upon a revolving wheel 63, which causes the chain as it is fed to the receptacle, to be rotated at the same speed and in the same direction as caused by the revolving wheel 46. Wheel 63 rotates on a bearing 64 forming part of frame 37.

Wheels 46 and 63 are provided with gear teeth 65 in mesh with pinions 66, one-fourth of the diameter of the wheels. The pinions 66 are secured to a vertical shaft 67, by which they are rotated. To vertical shaft 67 is secured a bevel gear wheel 68, in mesh with a bevel gear wheel 69, which is secured to a shaft 70 having a driving pulley 71 attached. Secured to shaft 70 is a cone pulley 72, which drives a cone pulley 73 by means of a belt 74. Cone pulley 73 is secured to a shaft 75, to which is fastened a worm 76 in mesh with a worm wheel 77. Worm wheel 77 is secured to a shaft 78, to which the wheel 61 is also secured. Rotation of the worm 76 by means of the belt and cone pulleys causes rotation of worm wheel 77, shaft 78, and wheel 61, and consequent forward movement of the chain.

In order to adjust the forward movement of the chain to suit different lengths of links, the belt 74 is shifted by means of the belt-shifter 79, so that the shaft 75 carrying the worm will move more or less than the shaft 70, which indirectly causes rotation of the chain, whereby the chain will continue to be rotated a quarter revolution for each revolution of shaft 70, although the shaft 75, carrying the worm, may make more or less than a revolution for one of shaft 70, and thereby cause different lengths of forward movement of the chain during each quarter revolution.

It will be seen that in order to avoid kinking of the links which would be caused by rotation of guide 45 in wheel 46; the links that have been heated are rotated by receptacle 62, and the links fed to said guide 45 are rotated by the link forming devices. Similarly, in order to avoid kinking of the links which are rotated by the link forming devices, said links are rotated by guide 45 in wheel 46; and the links that have been heated are rotated by receptacle 62.

In the modified machine shown by Figs. 10 to 16, inclusive, the mechanism for forming the series of connected links previously described will be used, and the chain will be passed through a cleansing solution in a tank 80 supported upon a frame 81. The chain passes up from the solution into a chamber 82, which is sealed from the entrance by a partition 83. The chain then passes up into a tube 84, and upon the outside of tube 84 a cover 85 for chamber 82 has vertical movement in order that tank 80 can be removed from its support on frame 81. From tube 84 the chain passes up into a chamber 86, through which a non-oxidizing gas for protection of the chain is conveyed by means of the pipes 87 and 88. Within the chamber 86 is placed a wheel 89, around which the chain is passed, and from which it passes at an angle into the upper end of a rotating tube 90 having guides 91, through which the chain passes vertically downward. While traveling from wheel 89 to the rotating tube 90, magnesia is poured onto the chain through a pipe 92. The magnesia, not finding lodgment on the chain, is permitted to fall into a drawer 93, which can be removed when necessary. As the chain turns from the angular line of travel into the vertical line of the rotating tube 90, the joint at the upper end of the links becomes exposed to a flame C from a blow-pipe burner 94, which is projected at right angles to the plane of each link. The chain is here protected from oxidation by means of a hood 95, having a vent 96 to permit escape of products of combustion and of surplus heat.

Surrounding the rotating tube 90 is a jacket 97 containing water which cools the chain while passing through the rotating tube after exposure to the flame C. The rotating tube is provided with a horizontal flange 98, which rides in a groove 99 forming part of the frame 81. Pivoted upon the rotating tube is a radial arm 100, carrying a spring-pressed pawl 101, which is adapted to engage a ratchet-wheel 102, secured to the lower end of the rotating tube. Arm 100 is connected by a link 103 to a pin 104 on a crank 105 secured to the lower end of a vertical shaft 106. Vertical shaft 106 is driven by means of bevel gearing 107 from a shaft 108 having a drive pulley 109 attached. During every revolution of crank 105, the rotating tube 90 is caused to make a quarter turn during half of the revolution of the crank, and to stand still during the other half. The crank pin 104 of crank 105 is connected by a link 110 to a pin 111 mounted on a lever 112 having a slot 113. By means of a nut and screw 114, the pin 111 can be adjusted in slot 113, so that rotation of crank 105 shall cause more or less oscillatory movement of lever 112 upon a vertical shaft 115, on which it is pivoted. Secured to vertical shaft 115 is a ratchet wheel 116, which is engaged by a spring-pressed pawl 117 pivoted upon lever 112 and adapted to cause rotation of said shaft when oscillated in one direction, but not in the other, whereby an intermittent rotary movement is imparted to the vertical shaft 115.

To the upper end of vertical shaft 115 is a worm 118 in mesh with a worm wheel 119 secured to a shaft 120, to which the wheel 89 is also secured. The intermittent movements of the shaft carrying the worm 118 thus causes an intermittent movement of the wheel, around which the chain passes, and by adjustment of the pin 111 in the slot 113 of lever 112, each rotation of crank 105 will cause a forward movement of the chain equal to the length of one link. Consequently the chain has an intermittent forward movement, and the machine is so made that the end of each forward movement of the chain occurs simultaneously with the end of each intermittent quarter revolution caused by the rotating tube 90. The intermittent forward movement and intermittent rotation of the chain by wheel 89 and tube 90 are made the same as the intermittent rotary and forward movements in the chain forming mechanism. It will be seen that owing to the slack portion of the chain in receptacle 80, the time of said movements of the chain forming mechanism need not of necessity be the same as those of wheel 89 and tube 90. Figs. 13 and 14 show the position of the chain at the end of each intermittent forward and rotary movement. In this position the guides 91 are holding a link 121 in a plane at right-angles to the direction of flame C. Owing to the inclination at which the chain is fed into the vertical tube 90, the abutting ends of a link 121 are directly exposed to the flame C, and will remain so during the time the chain is stationary.

When rotation of crank 105 causes rotation of tube 90, it also causes forward movement of the chain, and consequent downward movement in the guides 91 of tube 90, as shown in Figs. 15 and 16. A link 122 will then have entered a pair of guides 91 at right-angles to those which are holding link 121, and flame C will be striking against the upper part of link 122. At the end of a quarter revolution, the abutting ends of link 122 will be directly exposed to the flame C in the same manner as was link 121. Then again, during another intermittent forward and rotary movement of the chain, link 123 will enter a pair of guides 91 at right-angles to those which hold link 122, flame C will strike against the upper part of link 123, and at the end of a quarter revolution, the abutting ends of link 123 will be directly exposed to the flame C, and so forth. It will be readily seen that the flame C is directed toward the jointed portion of the links a longer time than toward the rest, owing to the time the chain remains stationary.

As the chain passes from rotating tube 90, it is delivered to a receptacle 124, which is rotated by means of an arm 125 engaging a pin 126 attached to ratchet-wheel 102.

I claim as my invention:

1. A machine for fastening interconnected chain links having abutting ends of solder cored wire, comprising means for rotating said interconnected links, adjustable means for imparting forward movement to a succession of said links equal to the length of one link for every quarter revolution thereof, and means for projecting a heating flame against said abutting ends of each of said links in succession.

2. A machine for fastening interconnected chain links having abutting ends of solder cored wire, comprising means for imparting continued intermittent forward movement to a succession of said links, a burner for projecting a heating flame against said abutting ends, and means for imparting a continued intermittent rotary movement to said links during their forward travel whereby said abutting ends are more exposed to said flame than the body of the links.

3. A machine for fastening interconnected chain links having abutting ends of solder cored wire, comprising means for imparting continued intermittent forward movement to a succession of said links, a burner for projecting a heating flame against said abutting ends, means for imparting a continued rotary movement to said links during their forward travel, and adjusting devices whereby the amount of forward movement which takes place during a quarter revolution of said links can be made equal to the length of one of said links, whereby the abutting ends of each link are more exposed to said flame than the body of the link.

4. A machine for fastening interconnected chain links having abutting ends of solder cored wire, comprising means for intermittently moving said links a quarter revolution, and for causing said abutting ends to be at the center of said revolution, means for imparting intermittent forward movements to a succession of said links equal to the length of one link for every quarter revolution thereof, means for projecting a heating flame across the path of travel of said links, and means for shifting the line of travel of said links at the junction with said flame, whereby the abutting ends of each link are moved away from an adjacent link and into range with said flame.

5. A machine for fastening interconnected chain links having abutting ends of solder cored wire, comprising means for imparting continued intermittent quarter revolutions to said links, means for imparting continued intermittent forward movement to a succession of said links equal to the length of one link for every quarter revolution thereof, and means for projecting a heating flame against said abutting ends of each of said links in succession.

6. A machine for fastening interconnected chain links having abutting ends of solder cored wire, comprising means for rotating said interconnected links, and for causing said abutting ends to be at the center of said rotation, means for imparting forward movement to a succession of said links equal to the length of one link for every quarter revolution thereof, means for projecting a heating flame across the path of travel of said links, and means for shifting the line of travel of said links at the junction with said flame, whereby the abutting ends of each link are moved away from an adjacent link and into range with said flame.

7. A machine for fastening interconnected chain links having abutting ends of solder cored wire, comprising means for rotating said interconnected links, means for imparting forward movement to a succession of said links, means for projecting a heating flame against said abutting ends, means for rotating the interconnected links fed to the first named link rotating means, and a rotating receptacle for the links that have been exposed to said flame, the direction of rotation being the same for each of said link rotating means.

8. A machine for fastening interconnected chain links having abutting ends of solder cored wire, comprising means for rotating said interconnected links, means for imparting forward movement to a succession of said links, means for projecting a heating flame against said abutting ends, and a receptacle for said heated links adapted to rotate said links in the same direction as the first named link rotating means.

9. A machine for fastening interconnected chain links having abutting ends of solder cored wire, comprising means for rotating said interconnected links, an actuating device for imparting forward movement to a succession of said links, an etching solution through which said links are drawn by said actuating device, thereby preparing said abutting ends for solder, and means for projecting heat energy against only said etched abutting ends during said forward and rotary movement of said links.

In testimony whereof, I affix my signature in the presence of two witnesses.

GEORGE HILLARD BENJAMIN.

Witnesses:
W. A. TOWNER, Jr.,
HELEN E. KOELSCH.